United States Patent

Ozawa et al.

(10) Patent No.: US 6,708,790 B2
(45) Date of Patent: Mar. 23, 2004

(54) FRONT-END STRUCTURE OF A VEHICLE

(75) Inventors: Ikuo Ozawa, Toyoake (JP); Toshiki Sugiyama, Kariya (JP); Norihisa Sasano, Aichi-pref. (JP); Noriaki Maeda, Kariya (JP); Kazuaki Kafuku, Chiryu (JP); Harumi Okai, Kariya (JP); Yasuhiko Itou, Toyota (JP); Tomoyuki Hatano, Nagoya (JP); Hiromi Takagi, Nagoya (JP); Takeshi Nagasaka, Kariya (JP); Yasushi Hibi, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/132,495

(22) Filed: Apr. 25, 2002

(65) Prior Publication Data

US 2002/0162695 A1 Nov. 7, 2002

(30) Foreign Application Priority Data

Apr. 26, 2001 (JP) .................................. 2001-130116
Jun. 11, 2001 (JP) .................................. 2001-176135

(51) Int. Cl.⁷ .............................................. B60K 11/04
(52) U.S. Cl. .................... 180/68.4; 180/291; 180/299
(58) Field of Search ................ 180/68.4, 68.6, 180/291, 292, 299, 68.5; 280/781, 785; 296/194, 203.02, 37.1, 30; 165/42, 43, 44

(56) References Cited

U.S. PATENT DOCUMENTS

| 2,104,771 A | * | 1/1938 | Saunders ................... 180/68.5 |
| 2,104,772 A | * | 1/1938 | Saunders ................... 180/68.5 |
| 3,199,578 A | * | 8/1965 | Rogers ........................ 165/44 |
| 3,352,353 A | * | 11/1967 | Stevens et al. ............... 165/41 |
| 4,445,587 A | * | 5/1984 | Hillman ...................... 180/229 |
| 4,763,723 A | * | 8/1988 | Granetzke .................... 165/67 |
| 5,031,712 A | * | 7/1991 | Karolek et al. ............ 180/68.2 |
| 5,065,814 A | * | 11/1991 | Loeber et al. ............... 165/41 |
| 5,082,075 A | * | 1/1992 | Karolek et al. ............ 180/68.2 |
| 5,348,114 A | * | 9/1994 | Yamauchi .................... 180/291 |
| 5,409,288 A | * | 4/1995 | Masuda ....................... 296/194 |
| 5,522,457 A | * | 6/1996 | Lenz .......................... 165/121 |
| 5,573,299 A | * | 11/1996 | Masuda ....................... 296/194 |
| 6,155,335 A | * | 12/2000 | Acre et al. ................... 165/41 |
| 6,186,583 B1 | * | 2/2001 | Martin ................... 296/193.09 |
| 6,196,624 B1 | * | 3/2001 | Bierjon et al. ......... 296/203.02 |
| 6,216,810 B1 | * | 4/2001 | Nakai et al. ............... 180/68.4 |
| 6,237,990 B1 | * | 5/2001 | Barbier et al. .............. 296/187 |
| 6,450,276 B1 | * | 9/2002 | Latcau ....................... 180/68.4 |
| 6,502,653 B1 | * | 1/2003 | Balzer et al. .............. 180/68.4 |
| 6,517,146 B1 | * | 2/2003 | Cheron et al. .............. 296/194 |

FOREIGN PATENT DOCUMENTS

| JP | 358047624 A | * | 3/1983 | ............... 180/68.4 |
| JP | A-7-89453 | | 4/1995 | |
| JP | A-9-2335 | | 1/1997 | |
| JP | A-2000-177633 | | 6/2000 | |

* cited by examiner

Primary Examiner—Brian L. Johnson
Assistant Examiner—Bridget Avery
(74) Attorney, Agent, or Firm—Harness, Dickey & Pierce, PLC (57) ABSTRACT

A front-end structure comprising a panel body (400) to which a center member (500), being fixed to a body of a vehicle at a front end of the vehicle and supporting, at least, a driving engine (E/G), is joined, wherein the panel body (400) is molded out of aluminum by die-casting and a joining section (421) of the panel body (400) to which the center member (500) is joined has a mechanical strength higher than that of any other sections of the panel body (400) near the joining section (421) except the joining section (421).

13 Claims, 7 Drawing Sheets

FRONT-END STRUCTURE OF A VEHICLE

BACKGROUND OF THE INVENTION

1. Field of the Invention

The present invention relates to a front-end structure to which a center member, which is fixed to the body of a vehicle at the front end of the vehicle and supports a driving engine, is joined.

2. Description of the Related Art

Figure 4A:
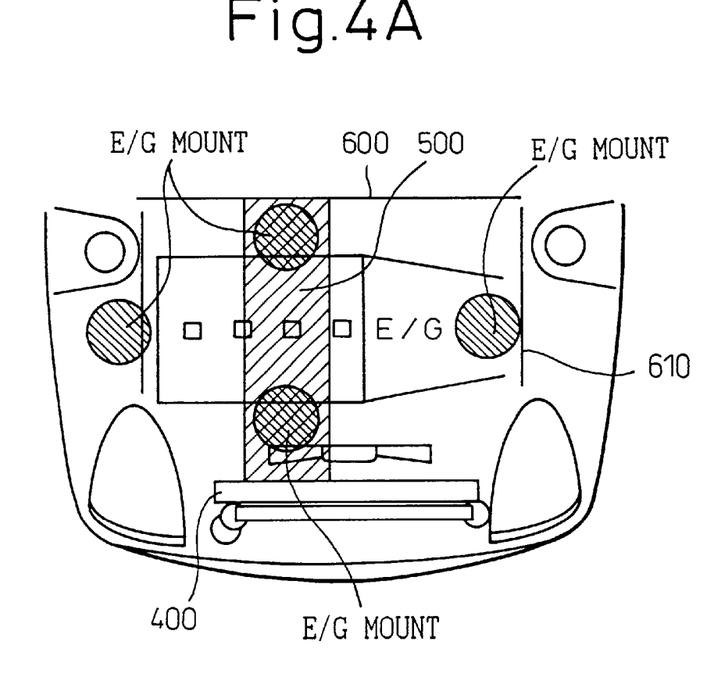
FIG. 4A is an exemplary plan view showing the mounting state of an engine.
Figure 4B:
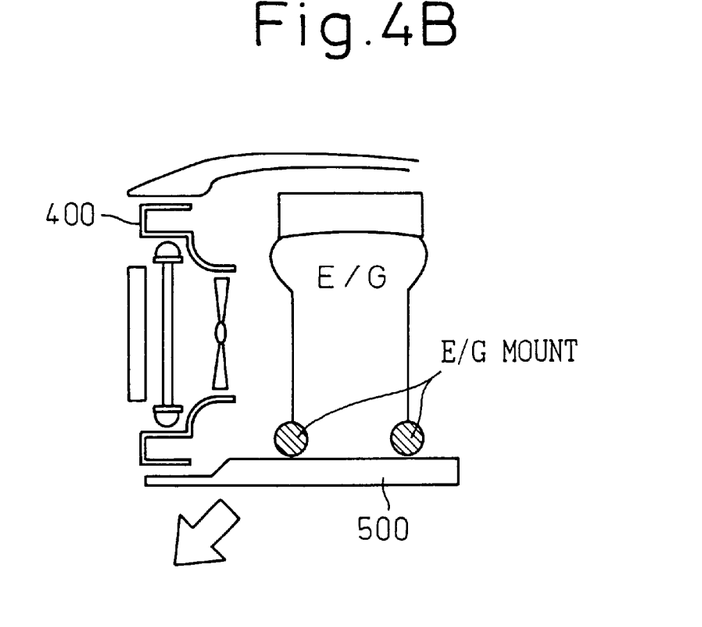
FIG. 4B is a side view of FIG. 4A.

In a typical (medium-size class) FF (front end engine, front-wheel drive) type vehicle, an engine is supported, as shown in FIGS. 4A and B, by a center member 500, bridging a panel body 400 and a body (dash panel) 600 of a vehicle, and a body (fender panel, side member) 610. For this reason, on a joining section of the panel body to which the center member is joined, a relatively large stress is produced by the weight of the engine. In FIG. 4A, shrouds are omitted for easy understanding.

On the contrary, the invention described in the specification of Japanese Patent No.2931605 achieves a weight reduction and productivity improvement of the panel body by forming it with resin and embedding reinforcing members formed by stamping steel into sections of the panel body, such as the joining section, to which a large load is applied, while keeping the necessary mechanical strength of the panel body.

However, as the above invention requires a mold for forming the panel body out of resin and a mold for forming the reinforcing members by stamping steel and also requires a mold adjuster for placing the reinforcing members in the cavity of the mold for forming the panel body out of resin, the capital investment increases and it is difficult to decrease the number of man-hours (manufacturing time) needed to manufacture the panel body.

Figure 2:
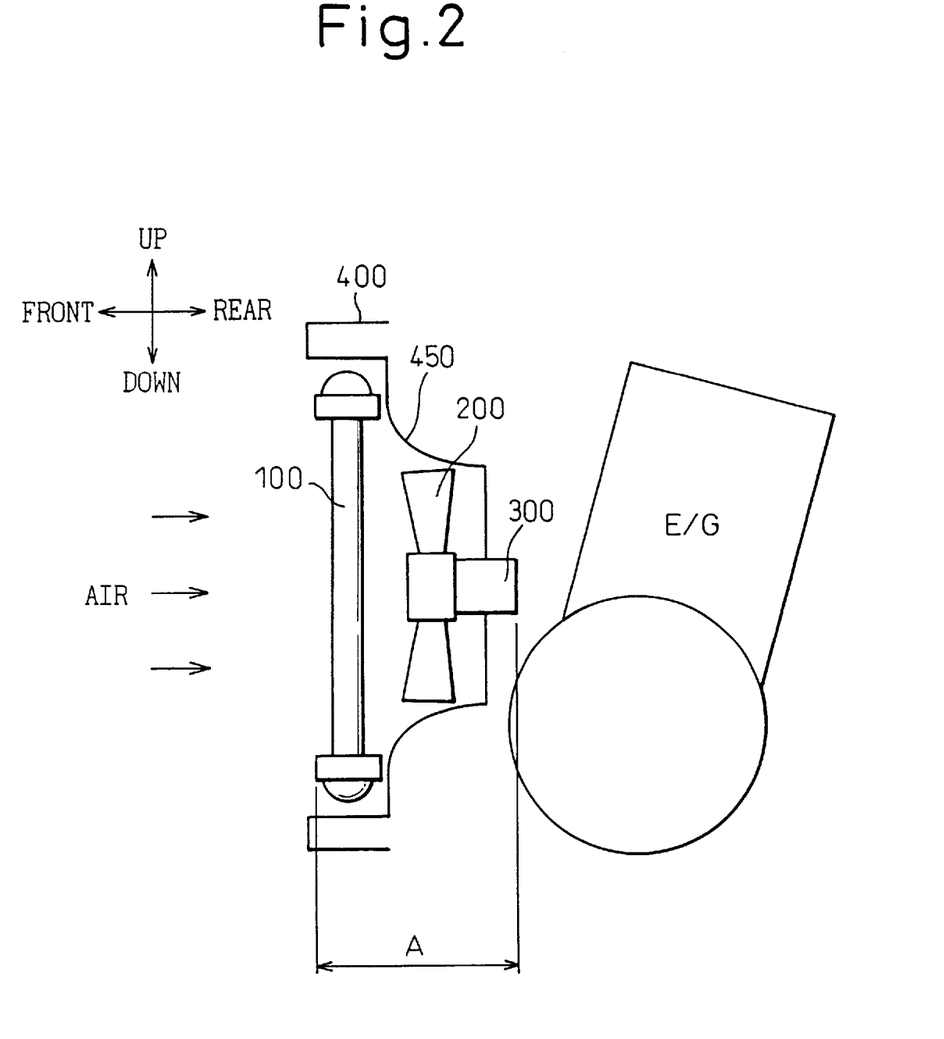
FIG. 2 is a side view of a front-end structure according to the embodiment of the present invention.

As shown in FIG. 2, a radiator 100 and fans 200 for supplying cooling air to the radiator 100 are usually attached to the panel body fixed to a body of a vehicle at a front end of the vehicle. However, as the fans 200 are attached directly to the shafts of the electric motors 300, and the fans 200 and the electric motors 300 are disposed in series in the cooling air flow, it is difficult to reduce the dimension A (this dimension A is called fan-shaft dimension A hereinafter), between the radiator and the electric motors, measured along the cooling air flow.

For this reason, it is difficult to downsize the vehicle while mounting the electric motors 300, an engine E/G, and other auxiliaries in an engine compartment so that the electric motors 300 do not interfere with the engine E/G and other auxiliaries disposed in a downstream part of a cooling air flow.

In addition, since it is not possible to avoid disposing the electric motors 300 near heat producing elements such as the engine E/G, the amount of heat given to the electric motors 300 by the engine E/G increases, and thereby heat damage to the electric motors 300 may occur.

In order to solve such problem, solutions such that the electric motors themselves are downsized to reduce the fan-shaft dimension A, or heat insulating materials are disposed between the electric motors 300 and the engine E/G may be proposed. However, when the electric motors themselves are downsized, the capacities of the electric motors 300 decrease, and thereby the durability of the electric motors 300 decreases and, when heat insulating materials are disposed between the electric motors 300 and the engine E/G, the numbers of parts and manufacturing man-hours increase.

SUMMARY OF THE INVENTION

It is therefore an object of the present invention to reduce the weight and the manufacturing cost of the panel body while keeping the necessary mechanical strength of the panel body.

It is another object of the present invention to reduce the fan-shaft dimension A.

In order to achieve the above objects, the present invention, in a first aspect, provides a front-end structure comprising a panel body (400) to which a center member (500), being fixed to a body of a vehicle at a front end of the vehicle and supporting, at least, a driving engine (E/G), is joined, wherein the panel body (400) is molded out of aluminum by die-casting and a joining section (421) of the panel body (400) to which the center member (500) is joined has a mechanical strength higher than that of any other section of the panel body (400) near the joining section (421) except the joining section (421).

In a second aspect, the present invention provides a front-end structure comprising a panel body (400) to which a center member (500), being fixed to a body of a vehicle at a front end of the vehicle and supporting, at least, a driving engine (E/G), is joined; wherein the panel body (400) comprises an upper beam (410) which is disposed at the top of the panel body (400) and extends in a horizontal direction, a lower beam (420) which is disposed at the bottom of the panel body (400), extends in a horizontal direction, and is provided with a joining section (421) to which the center member (500) is joined, and pillars (430) which extend upward and downward to join the upper and lower beams (410, 420); wherein the upper and lower beams (410, 420) and the pillars (430) are integrally molded out of aluminum by die-casting; and wherein the joining section (421) has a mechanical strength higher than that of any other section of the lower beam (420) except the joining section (421).

In a third aspect, the present invention provides a front-end structure wherein the mechanical strength of the joining section (421) may be enhanced by increasing the thickness of the joining section (421).

In a fourth aspect, the present invention provides a front-end structure wherein the mechanical strength of the joining section (421) may be enhanced by providing reinforcing ribs (423).

In a fifth aspect, the present invention provides a front-end structure wherein the panel body (400) has integrally-molded shrouds (450) for preventing, by covering the clearance between a radiator (100) of the vehicle and a fan (200) for supplying cooling air to the radiator (100), that the air flow induced by the fan (200) detours around the radiator (100).

In a sixth aspect, the present invention provides a front-end structure of a vehicle which is fixed to the body of the vehicle at the front end of the vehicle and has a panel body (400) to which at least a radiator (100) is attached; wherein the front-end structure comprises a fan (200), which is attached to the front-end panel (400) and supplies cooling air to the radiator (100), and a driving means (300) which is disposed in a position, in the panel body (400), deviated from the rotation center of the fan (200) and rotates the fan (200) via a belt (310); and wherein the panel body (400) is made of metal.

In a seventh aspect, the present invention provides a front-end structure of a vehicle wherein the panel body (400)

may have integrally-molded shrouds (450) for preventing, by covering the clearance between the fan (200) and the radiator (100), that the air flow induced by the fan (200) detours around the radiator (100).

In an eighth aspect, the present invention provides a front-end structure of a vehicle wherein the panel body (400) may have integrally-molded belt covers (460) for covering the belt (310).

In a ninth aspect, the present invention provides a front-end structure of a vehicle, wherein a plurality of the fans (200) may be attached to the panel body (400) and may be rotated by the driving means (300) via the belt (310).

In a tenth aspect, the present invention provides a front-end structure of a vehicle wherein the panel body (400) may be provided with a cooling air inlet (411) for conducting the cooling air to the driving means (300).

In an eleventh aspect, the present invention provides a front-end structure of a vehicle wherein the fan (200) is disposed at a more downstream side of the cooling air flow than the radiator (100).

In a twelfth aspect, the present invention provides a front-end structure of a vehicle wherein the panel body (400) is preferably molded out of aluminum by die-casting.

In the above aspects, characters or numerals in parentheses are used to show an example of embodiments of the present invention and correspond to the specific components in the embodiments discussed later.

The present invention may be more fully understood from the description of the preferred embodiments of the invention set forth below, together with the accompanying drawings.

DESCRIPTION OF THE PREFERRED EMBODIMENTS

Figure 1:
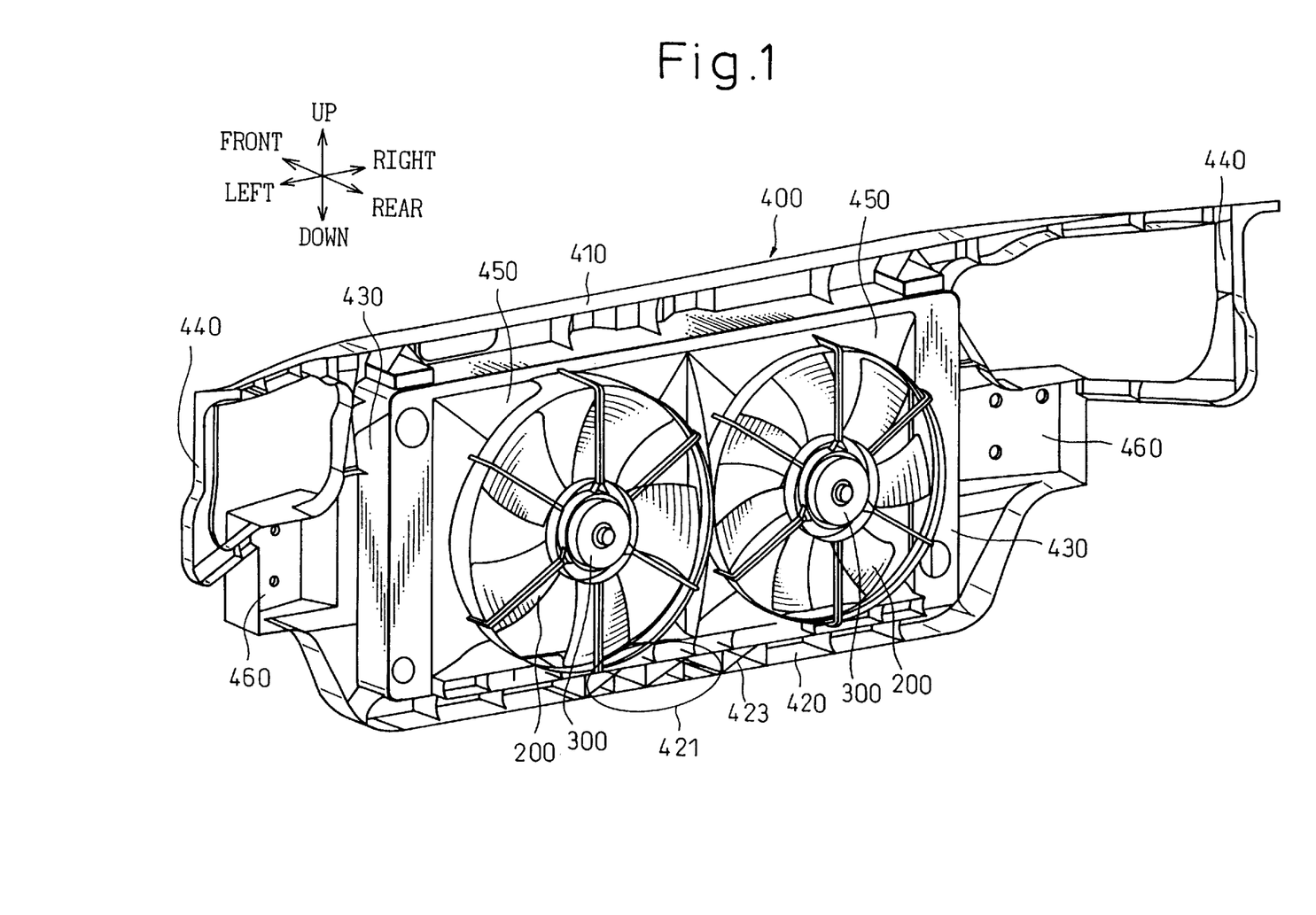
FIG. 1 is a perspective view of a front-end structure according to an embodiment of the present invention.

FIG. 1 is a perspective view of a panel body (called a "panel" in short, hereinafter) 400 according to an embodiment of the present invention. As shown in FIG. 2, a radiator 100 for cooling the cooling water for a vehicle driving engine (internal combustion engine) E/G, fans 200 for supplying cooling air to the radiator 100, electric motors (driving means) 300 for driving the fans 200, a center member 500 (see FIG. 4) for supporting the engine E/G, etc. are attached to the panel (panel body) 400.

FIG. 1 is a perspective back (engine E/G side) view of the panel 400. The radiator 100, the fans 200, the electric motors 300, and the engine E/G are arranged in this order, as shown in FIG. 2, in series along the cooling air flow from a front side of a vehicle.

The panel 400 comprises, as shown in FIG. 1, an upper beam 410 which is disposed at the top of the panel 400 and extends in a horizontal direction, a lower beam 420 which is disposed at the bottom of the panel 400 and extends in a horizontal direction, pillars 430 which extend upward and downward to join the upper and lower beams 410 and 420, light stays 440 to which head lights (not shown in Figs.) are attached, etc. These components 410 to 440 are integrally molded out of aluminum by die-casting.

Furthermore in this embodiment, the panel 400 has integrally-molded shrouds 450 which support the fans 200 so as to allow them to rotate, and which prevents, by covering the clearance between the fans 200 and the radiator 100, that the air flow induced by the fans 200 detours around the radiator 100.

By the way, the reference numeral 460 denotes side joining sections through which the panel 400 is fixed to side members (not shown) of the vehicle body by joining means such as bolts. The lower beam 420 is provided with a center joining section (the circled section in FIG. 1) 421 for joining the center member (see FIG. 4) 500 at the longitudinal center section of the lower beam 420.

Figure 3:
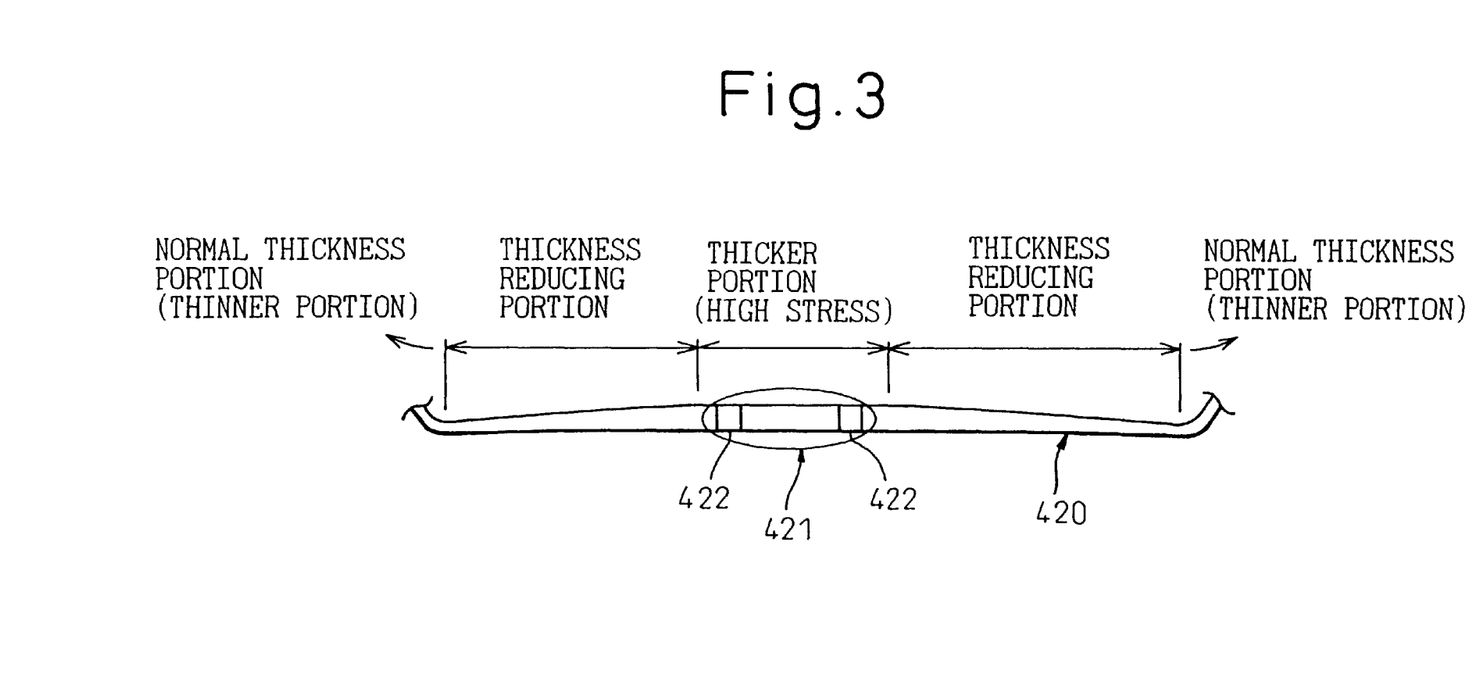
FIG. 3 is a front view (viewed from an engine side) of a lower beam of a front-end structure according to an embodiment of the present invention.

In this embodiment, in order that the center member 500 is joined to the lower beam 420 (panel 400) with detachable/attachable joining means such as bolts, the center joining section 421 is provided with holes 422 (with a female thread) to which bolts are fitted, as shown in FIG. 3.

Furthermore, in this embodiment, in order that the center joining section 421 has a mechanical strength (bending rigidity, shear strength, torsional rigidity, etc.) higher than that of any other section of the lower beam 420 except the center joining section 421, the thickness of the center joining section 421 is, as shown in FIG. 3, larger than that of any other section of the lower beam 420 except the center joining section 421, and the center joining section 421, as shown in FIG. 1, provided with more reinforcing ribs 423 (plate-shaped reinforcing members) than any other section, which constitutes a truss construction.

Figure 5:
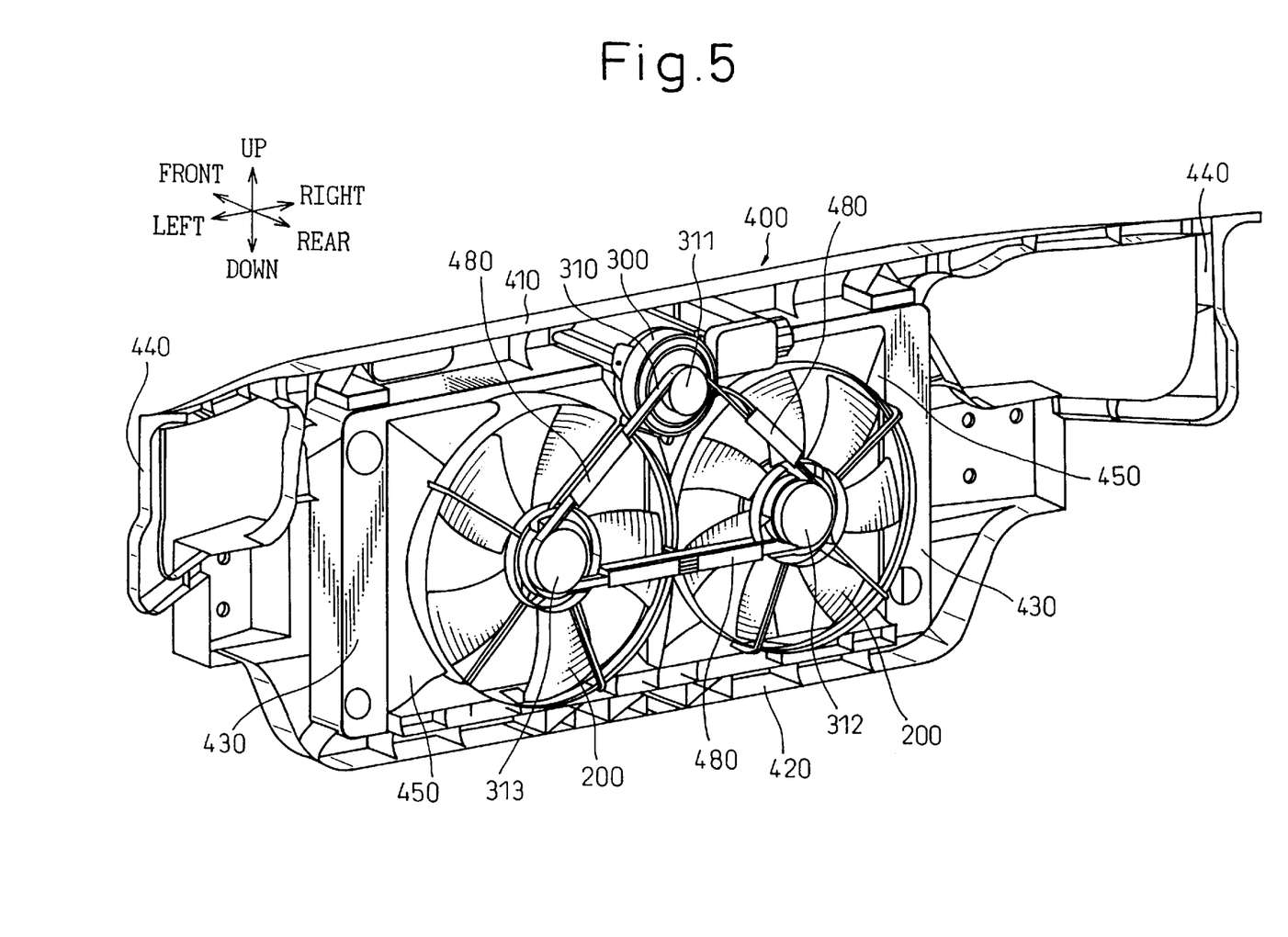
FIG. 5 is a perspective view of a front-end structure according to another embodiment of the present invention.
Figure 6:
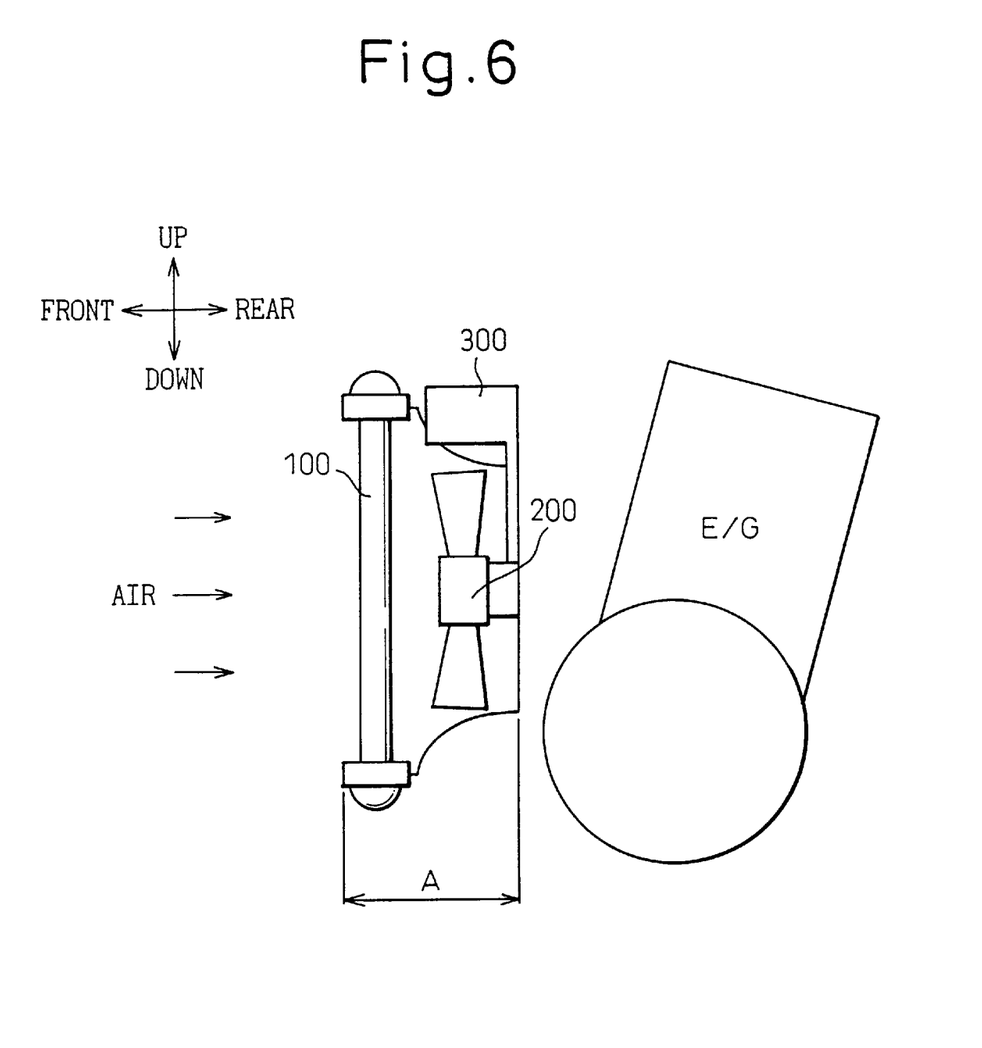
FIG. 6 is a side view of a front-end structure according to another embodiment of the present invention.

FIG. 5 is a perspective view of a front-end structure (front-end panel) according to another embodiment of the present invention. In this embodiment of the present invention, as shown in FIG. 6, an example, in which a radiator 100 for cooling the cooling water for a vehicle driving engine (internal combustion engine), fans 200 for supplying cooling air to the radiator 100, and an electric motor (driving means) 300 for driving the fans 200 are attached to a panel body 400 (called a "panel" in short hereinafter), is shown.

FIG. 5 is a perspective back (engine side) view of the panel 400. The radiator 100, the fans 200, and the engine E/G are arranged in this order, as shown in FIG. 6, in series along the cooling air flow from the front side of the vehicle. In this embodiment, axial-flow fans (see No.1012 of JIS B 0132) which gas (air) passes through in the axial direction are adopted as the fans 200.

The panel 400 comprises, as shown in FIG. 5, an upper beam 410 which is disposed at the top of the panel 400 and extends in a horizontal direction, a lower beam 420 which is disposed at the bottom of the panel 400 and extends in a horizontal direction, pillars 430 which extend upward and downward to join the upper and lower beams 410 and 420, light stays 440 to which head lights (not shown) are attached, etc. These components 410 to 440 are integrally molded out of aluminum by die-casting.

Furthermore, the panel 400 has integrally-molded shrouds 450 which support the fans 200 so as to allow them to rotate, and which present, by covering the clearance between the fans 200 and the radiator 100, that the air flow induced by the fans 200 detours around the radiator 100, and an integrally molded belt cover 480 for covering the belt 310.

The two fans 200 are rotated by the single electric motor 300 (called a "motor 300" in short hereinafter) which is attached to the panel 400 in a position (position between the two fans 200 and near the upper beam 410 in this embodiment) deviated from the rotation centers of the fans 200, and the numbers of revolution of the two fans 200 (ratios of the revolution numbers of the two fans 200 to those of the motor 300) are adjusted with the pulleys 311 to 313 attached to a motor shaft (not shown) and fan shafts (not shown).

Figure 7:
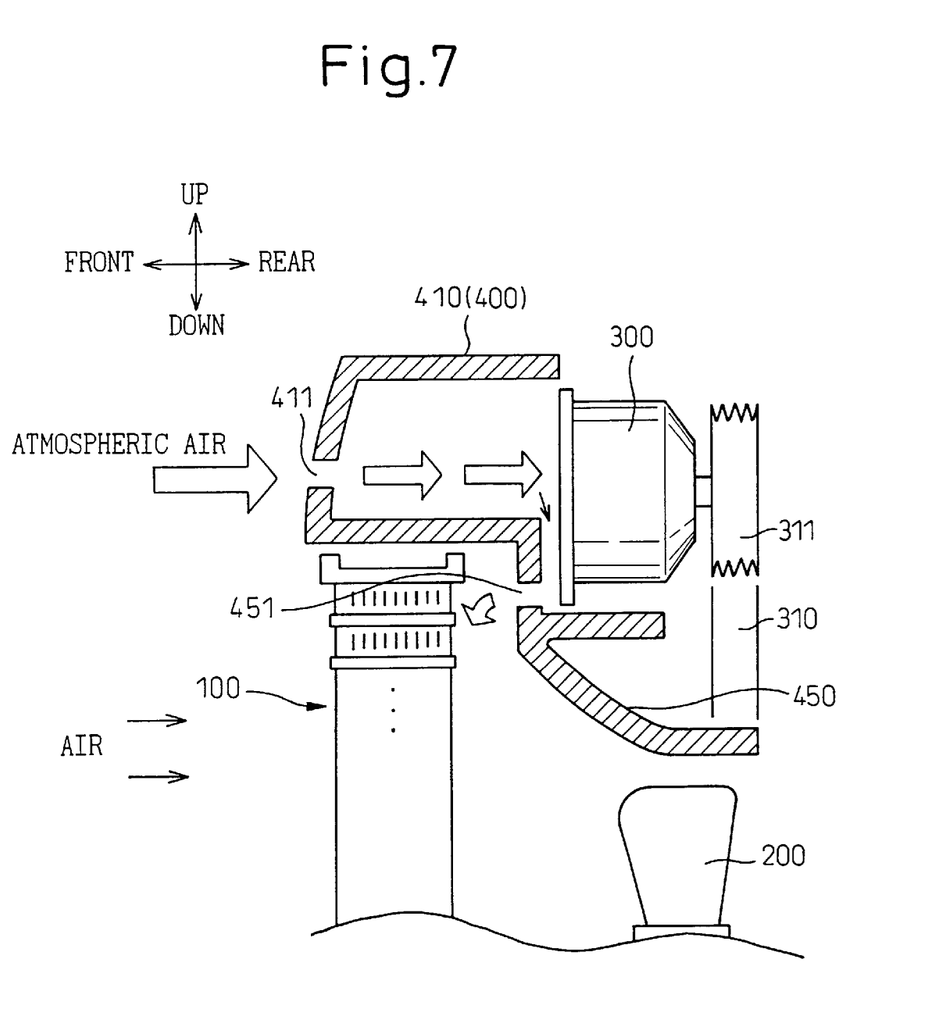
FIG. 7 is an enlarged cross-sectional view of a cooling air inlet of a front-end panel according to another embodiment of the present invention.

Furthermore, the upper beam 410 (panel 400) is, as shown in FIG. 7, is provided with a cooling air inlet 411 for conducting the cooling air, for cooling the motor 300, to the motor 300 and the shrouds 450 are provided with an exhaust outlet 451 for exhausting the cooling air the temperature of which has increased after cooling the motor 300.

Therefore, when the motor 300 rotates and then the fans 200 rotate, the pressure inside the upper beam 410 (panel 400) becomes a negative pressure in relation to the outside pressure (atmospheric pressure), so that the outside air (cooling air) thus flows to the motor 300 side from the cooling air inlet 411 side to cool the motor 300. The cooling air which has cooled the motor 300 is drawn by the cooling air passing through inside the shrouds 450 (area facing the radiator 100) and is exhausted from the exhaust outlet 451.

Next, the function and effects of the embodiments will be described.

In the above embodiments, as the center joining section 421, of the panel 400, to which the center member 500 is joined has a mechanical strength higher than that of any other section (sections, of the lower beam 420, other than the center joining section 421 in the embodiments) of the panel 400 near the center joining section 421 except the center joining section 421, and the whole of the panel 400 is made of aluminum, so that the weight of the panel 400 can be reduced while retaining the necessary mechanical strength of the panel 400.

In addition, as the whole of the panel 400 is made of metal, it is not necessary to embed (insert-mold) reinforcing steel members into the panel 400 when molding the panel 400, and thereby the number of man-hours (manufacturing time) needed to manufacture the panel 400 can be decreased.

Consequently, in these embodiments, the weight and manufacturing cost of the panel 400 can be reduced while keeping the necessary mechanical strength of the panel 400.

Furthermore, as the shrouds 450 are integrally molded with the panel 400, the shrouds 450 can function as reinforcing members of the panel 400 and, thus, it is possible to secure the necessary mechanical strength without adding any separate reinforcements to the panel 400. Consequently, the mechanical strength and stiffness of the panel 400 can be improved while reducing the weight of the panel 400 having the shrouds 450.

Furthermore, as the shrouds 450 are integrated with the panel 400, the numbers of man-hours (assembling time) for assembling the vehicle can be reduced as compared with that in case that the separate shrouds are attached to the panel 400.

By the way, when the shrouds 450 are integrally formed with the panel 400, as shown in FIG. 1, the form of the panel 400 becomes complex, and it is therefore very difficult to form the panel 400 by press work.

On the contrary, in the embodiments, as the panel 400 is formed by die casting, the panel 400 having integrally-molded shrouds 450 can be formed (manufactured) easily.

Furthermore, in the embodiment, as the motor 300 is disposed in a position deviated from the rotation centers of the fans 200 to drive the fans 200 via the belt 310, the fan-shaft dimension A can be reduced as compared with that in case of the arrangement (see FIG. 2) in which the fans 200 and motors 300 are disposed in series in the cooling air flow, as shown in FIG. 4.

Thus, it is possible to downsize the vehicle while mounting the engine E/G, auxiliaries and the motor 300 in the engine compartment so that the engine E/G and auxiliaries do not interfere with the motors 300 and, as there can be some gaps for heat insulation between the motor 300 and heat producing elements such as the engine E/G, heat damage to the motor 300 can be prevented.

Furthermore, since it is not required that a heat insulating material is disposed between the motor 300 and the engine E/G, or that the electric motor 300 is downsized, the number of parts and number of man-hours can be reduced while preventing a reduction in the durability of the motor 300.

By the way, in this embodiment, the fans 200 are driven via the belt 310, and in a belt driven system, in general, it is necessary to stretch the belt with a relatively high tension in order to prevent slip between the pulleys and the belt.

In such a case, when the panel 400 is made of resin, it is difficult to continue to maintain the sufficient tension of the belt 310 because of the insufficient strength of the panel 400 relative to the tension of the belt 310 and the aging deformation (creep deformation) of the panel 400.

On the contrary, in this embodiment, as the panel 400 is molded out of aluminum by die casting, there is no problem such as insufficient strength of the panel 400 with respect to the tension of the belt 310 and the aging deformation (creep deformation) of the panel 400, and thereby it can continue to maintain sufficient tension in the belt 310. Consequently, the reliability (durability) of the panel 400 can be improved.

Furthermore, as the motor 300 is cooled with the forced cooling air supplied from the cooling air inlet 411, heat damage to the motor 300 can be prevented.

(Other Embodiments)

In the embodiments described above, the shrouds 450 are integrally molded with the panel 400. However, the present invention is not restricted to this, and the shrouds 450 and the panel 400 may be formed separately.

Furthermore, in the embodiments described above, in order that the center joining section 421 has a mechanical strength higher than that of any other section, of the lower beam 420, except the center joining section 421, the thickness of the center joining section 421 is larger than that of any other section, of the lower beam 420, except the center joining section 421, and the center joining section 421 is provided with more reinforcing ribs 423 than any other section. However, the present invention is not restricted to this and, for example, either of the thickness of the center joining section 421 or the number of reinforcing ribs 423 of the center joining section 421 may be increased, or the center joining section 421 may have a cross-section from which a large geometrical moment of inertia is derived.

Furthermore, in the embodiments described above, the center member 500 is joined to the panel 400 with bolts. However, the present invention is not restricted to this, and the center member 500 may be joined to the panel 400 with any other joining (connecting) means.

In the embodiments described above, the panel 400 is molded out of aluminum by die casting. However, the present invention is not restricted to this, and the panel 400 may be molded out of another metal such as titanium or chrome-molybdenum steel.

Furthermore, in the embodiments described above, the panel 400 is formed by die-casting. However, the present invention is not restricted to this, and the panel 400 may be formed by stamping, forging, or any other casting method.

Furthermore, in the embodiment described above, the shrouds 450 and belt covers 480 are integrally molded with the panel 400. However, the present invention is not restricted to this, and, for example, the shrouds 450 and belt covers 480 may be attached to the panel 400 with joining means such as bolts.

Furthermore, in the embodiments described above, the fans 200 are disposed in a more downstream side of the air flow than the radiator 100. However, the present invention is not restricted to this, and the fans 200 may be disposed in an upstream side of the air flow than the radiator 100.

Furthermore, in the embodiment described above, the number of the fans 200 is two. However, the present invention is not restricted to this, and the number of the fans 200 may be one, three, or more. Likewise, the number of the motors 300 may be two or more.

While the invention has been described by reference to specific embodiments chosen for the purposes of illustration, it should be apparent that numerous modifications could be made thereto by those skilled in the art without departing from the basic concept and scope of the invention.

What is claimed is:

1. A front-end structure of a vehicle: having a panel body that is fixed to a body of a vehicle at a front end of the vehicle and to which at least a radiator is attached; wherein:
    the front-end structure comprises a fan which is attached to said panel body and supplies cooling air to said radiator, and a driving means that is disposed in a position, in said panel body, deviated from the rotation center of said fan and rotates said fan via a belt;
    said panel body is made of metal; and
    said panel body is provided with a cooling air inlet for conducting cooling air to said driving means, said driving means is an electric motor.

2. The front-end structure of a vehicle of claim 1, wherein said panel body has integrally-molded shrouds for preventing, by covering the clearance between said fan and said radiator, that air flow induced by said fan detours around said radiator.

3. The front-end structure of a vehicle of claim 1, wherein said panel body has at least an integrally-molded belt cover for covering said belt.

4. The front-end structure of a vehicle of claim 1, wherein a plurality of said fans are attached to said panel body and are rotated by said driving means via said belt.

5. The front-end structure of a vehicle of claim 1, wherein said fan is disposed in a more downstream side of the cooling air flow than said radiator.

6. The front-end structure of a vehicle of claim 1, wherein said panel body is molded out of aluminum by die-casting.

7. A front-end structure of claim 1, wherein said fan is adapted to suck air into an engine room, from the front of the vehicle, said cooling air inlet being formed at a front surface of the panel body, an exhaust outlet being formed on a more upstream side of the cooling air flow than the fan to discharge the cooling air which has been used to cool the motor.

8. A front-end structure of claim 1, comprising the panel body to which a center member, being fixed to a body of a vehicle at a front end of the vehicle and supporting, at least a driving engine is joined, wherein:
    said panel body is molded out of aluminum by die-casting; and
    a joining section, of said panel body, to which said center member is joined, has a mechanical strength higher than that of any other section of said panel body near said joining section except said joining section.

9. A front-end structure of claim 1, comprising the panel body to which a center member, being fixed to a body of a vehicle at a front end of the vehicle and supporting, at least, a driving engine, is joined, wherein:
    said panel body comprises:
        an upper beam that is disposed at a top of the panel body and extends in a horizontal direction;
        a lower beam that is disposed at a bottom of the panel body, extends in a horizontal direction, and is provided with a joining section to which said center member is joined; and
        pillars that extend upwards and downwards to join said upper and lower beams; and
    said upper and lower beams and said pillars are integrally molded out of aluminum by die-casting; and
    said joining section has a mechanical strength higher than that of any other section of said lower beam except said joining section.

10. A front-end structure of claim 7, wherein:
    said panel body comprises:
        an upper beam that is disposed at a top of the panel body and extends in a horizontal direction;
        a lower beam that is disposed at a bottom of the panel body, extends in a horizontal direction, and is provided with a joining section to which said center member is joined;
        pillars that extend upwards and downwards to join said upper and lower beams; and
        a shroud that prevents the cooling air from detouring the radiator; and
    said cooling air inlet is formed in the upper beam, and said exhaust outlet is formed in the shrouds.

11. The front-end structure of claim 8, wherein the mechanical strength of said joining section is enhanced by increasing the thickness of said joining section.

12. The front-end structure of claim 8, wherein the mechanical strength of said joining section is enhanced by providing reinforcing ribs.

13. The front-end structure of a vehicle of claim 8, wherein said panel body has integrally-molded shrouds for preventing, by covering the clearance between a radiator of said vehicle and at least a fan for supplying cooling air to said radiator, that air flow induced by said at least a fan detours around said radiator.

* * * * *